April 9, 1968 JAMES E. WEBB 3,377,208
ADMINISTRATOR OF THE NATIONAL AERONAUTICS
AND SPACE ADMINISTRATION
THERMOCOUPLE ASSEMBLY
Filed Nov. 10, 1964

INVENTOR
RICHARD C. TURNER
BY
ATTORNEYS

United States Patent Office 3,377,208
Patented Apr. 9, 1968

3,377,208
THERMOCOUPLE ASSEMBLY
James E. Webb, Administrator of the National Aeronautics and Space Administration, with respect to an invention of Richard C. Turner, Levittown, Pa.
Filed Nov. 10, 1964, Ser. No. 410,332
5 Claims. (Cl. 136—230)

ABSTRACT OF THE DISCLOSURE

A thermocouple assembly which consists of a flexible strip of tape, such as nylon. One or a first side of the tape, having adhesive properties, is used to adhesively support a junction of a thermocouple, as well as for adhesively attaching the assembly to the surface of matter whose temperature is to be sensed. The opposite or a second side of the tape has heat-reflecting properties, achieved by means of a metallic coating, in order to minimize heat which is directed to the junction through the tape. A pair of terminals, electrically insulated from one another, are supported on the second side of the tape to provide means for electrically connecting the thermocouple junction to appropriate circuitry.

Origin of invention

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to a thermocouple and more particularly to an improved assembly thereof.

The use of thermocouples as temperature sensing devices is quite widespread in both military and civilian applications.

In designing thermocouples, designers strive to reduce the size of the thermocouple bead or junction point of the two thermocouple leads, since the smaller the bead's surface, the smaller is the undesired heat radiation therefrom. Further, a smaller bead is less affected by incident heat radiation or by the rate of change of surface temperature. In addition, the response time of the thermocouple to temperature changes is related to its thermal mass. Thus, a smaller bead having less mass produces less time delay in the signals supplied to indicate the temperature which is sensed. Designers also strive to use relatively short and small leads to connect the bead to the rest of the circuitry, since the effects of conduction along the leads is directly related to their size and, appreciable conduction loss along the leads reduces the surface temperature being measured, thereby giving false readings. However, irrespective of the desired to reduce the size of the bead and its leads, the entire thermocouple assembly must be sufficiently rigid so that the thermocouple may be fastened to the surface, the temperature of which is to be sensed, as well as be coupled to the leads connecting the thermocouple to the additional circuitry used to register the sensed temperature.

An optimized thermocouple assembly is one which, besides being small but rigid, can be easily installed on the surface to be measured as well as easily removed therefrom. Such characteristics are especially important where thermocouples are only temporarily attached to surfaces of systems or devices which are tested during their development stages, as for example, the many tests performed on systems and vehicles to be used for space exploration.

Additional requirements are imposed in temperature measurements of spacecraft where heat exchange by radiation is appreciable and in some cases predominant. In such cases, it is necessary to shield the back of a thermocouple with a material having a low emissivity, namely, a material which is a good heat reflector. This insures that the thermocouple is measuring the surface to which it is attached rather than that of a body elsewhere in the spacecraft which is radiating to it or receiving radiation from the thermocouple.

Accordingly, an object of this invention is the provision of an improved thermocouple assembly.

Another object of the present invention is the provision of a novel thermocouple assembly which, due to its small size, produces accurate temperature information.

Yet another object of the present invention is the provision of a novel thermocouple assembly incorporating a small thermocouple bead which is substantially unaffected by extraneous undesired heat inputs by thermal radiation of a nearby radiating body or by the rate of change of the temperature being sensed.

Yet another object of this invention is to provide a small thermocouple assembly which is easily attachable to, and removable from, the surface whose temperature is to be sensed.

A further object of the present invention is to provide a thermocouple that will give accurate surface temperature measurements in a total vacuum, such as space environmental conditions, without altering the temperature distribtuion that would have existed had the thermocouple not been there.

These and other objects of this invention are achieved by a thermocouple assembly in which a small thermocouple bead formed at the junction point of two small thermocouple leads is taped to a good heat reflecting pressure sensitive tape such as aluminized pressure sensitive nylon tape. The tape is conveniently used to attach the thermocouple bead to the desired surface. The two open ends of the two small thermocouple leads are connected to two contact points such as soldering pins provided on a small glass epoxy board, the other side of the board being taped to the aluminized nylon tape by means of a double face pressure sensitive Mylar tape. The contact points on the board are used to connect the open ends of the thermocouple leads to interconnecting leads for transmitting signals indicative of the temperature sensed by the thermocouple bead to temperature registering circuitry. Since such circuitry is in general a distance away from the surface, the temperature of which is to be measured, the interconnecting leads are generally quite long and therefore of significant weight. The weight of such interconnecting leads generally produce tensile strains which, in a conventional thermocouple assembly, are directly transmitted to the thermocouple leads. Thus, conventional thermocouple leads must be of sufficient size to withstand the tensile strains without breaking. However, in the present invention, the tensile strains produced by the interconnecting leads are transmitted to the contact joints mounted on the epoxy board rather than to the thermocouple leads. Therefore, in the present invention, small sized thermocouple leads are used without excessive tensile strains being produced by interconnecting leads which can strain and break either or both thermocouple leads and thus damage the thermocouple.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
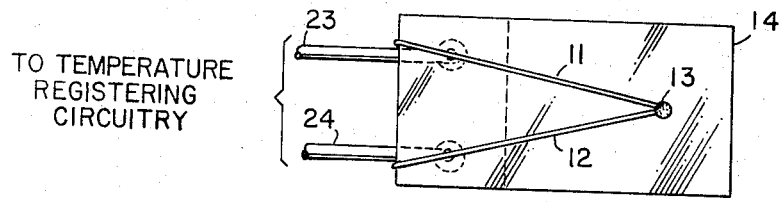
FIGURE 1 is a bottom elevational view of one embodiment of the invention.

Reference is now made to FIGURE 1 which is a bottom elevational view of the novel thermocouple assembly of the invention. As shown therein, the assembly includes two small size thermocouple leads 11 and 12, joined at one end to form a welded bead 13 which serves as the thermocouple junction. The bead 13, together with the leads 11 and 12, are fastened to an adhesive heat reflecting surface of a high temperature pressure sensitive tape 14, such as aluminized pressure sensitive nylon tape. The tape is aluminized on the non-adhesive surface so that as the bead is held by the adhesive side, any external heat exchanged by radiation is reflected by the aluminized surface, thereby insuring that the thermocouple measures only the temperature of the surface to which it is attached. The tape 14, in addition to supporting the bead 13 so that the tensile strain produced by the bead on the leads 11 and 12 is greatly minimized so that smaller size leads may be used, the tape 14 also serves as the means of attaching the welded bead 13 to the surface, the temperature of which is to be sensed. Attaching is conveniently accomplished by adhesively fastening the tape to the desired surface.

Figure 2:
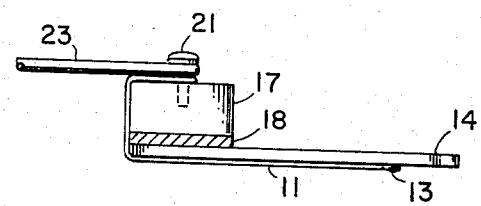
FIGURE 2 is a side elevational view of the thermocouple assembly of the invention.
Figure 3:
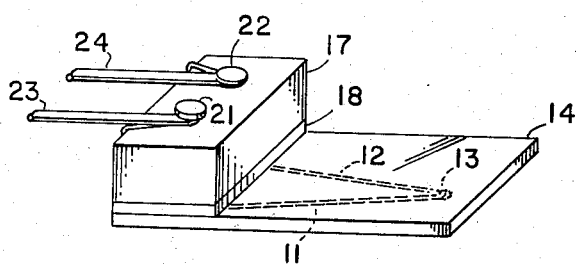
FIGURE 3 is an isometric view of the embodiment of the invention shown in FIGURE 1.

Referring now to FIGURES 2 and 3 which are respectively side elevational views and an isometric view of the thermocouple assembly of the invention, therein, the rest of the thermocouple assembly is shown comprising a mounting board 17 which is connected to, along one side thereof, the tape 14 by means of a double-faced adhesive pressure sensitive material 18. The board 17, which is made of electrically non-conducting material such as glass epoxy, has a pair of contact points such as soldering pins 21 and 22 mounted on the top face thereof. The open ends of the thermocouple leads 11 and 12 are joined to interconnecting leads 23 and 24 respectively at the soldering pins 21 and 22. As shown in FIGURES 2 and 3, the other ends of the interconnecting leads are connected to conventional temperature registering circuitry (not shown) which is energized by the signals transmitted through leads 11, 12, 23, and 24, the signals being indicative of the temperature sensed by the welded bead 13.

Figure 4:
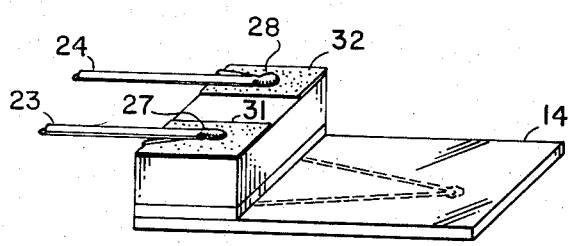
FIGURE 4 is an isometric view of another embodiment of the present invention.

In another preferred embodiment of the invention shown in FIGURE 4 in isometric view, the thermocouple leads 11 and 12 are connected to leads 23 and 24 respectively by means of solder points 27 and 28 respectively, soldered on separate copper surfaces 31 and 32 which are coated on the top side of the mounting block 17. Such a soldering arrangement on copper surfaces is an alternative to the use of soldering pins as the means of connecting the thermocouple leads 11 and 12 to the interconnecting leads 23 and 24 respectively.

In an actual reduction to practice of the latter described embodiment of the invention, a piece of mounting board having dimensions of .312 by .125 by .030 inch was adhesively fastened, by means of a double-face pressure sensitive tape, to a strip of aluminized pressure sensitive nylon tape .312 inch wide and about .500 inch long. Each of the two small areas on the top side of the block, which is copper coated to a thickness of .005 inch, was used to solder thereon the open end of one of two 36 gauge copper and constantan thermocouple leads, to one of the two interconnecting leads of 26 gauge copper and constantan wires. It is apparent, however, that the assembly of the invention can be made using any thermocouple materials such as iron-constantan, chromel-alumel, and others. The choice of material depends upon the means one chooses to measure the signal and the temperature range and accuracy required. The other open ends of the two 36 gauge copper-constantan thermocouple leads which were cut to a length of approximately .500 inch, were welded together to form a thermocouple junction in the shape of a bead of approximately .02 inch in diameter. The bead and the thermocouple leads extending therefrom were adhesively fastened to the adhesive surface of the aluminized pressure sensitive nylon tape. The entire thermocouple assembly was then tested and found to perform most satisfactorily, due largely to the small size of both the bead and the leads connected thereto which, as previously explained, greatly affect the performance of the thermocouple. In addition, the aluminized pressure sensitive nylon tape was found to be a most convenient means for attaching the thermocouple, or removing it from, the surface whose temperature is to be sensed.

There has been described and shown hereinabove a novel, useful and practical thermocouple assembly. The foregoing description, including the specific values recited in connection with the assembly which had actually been reduced to practice, has been presented for exemplary purposes only, the invention not intended to be limited thereto.

The assembly, as disclosed herein, is particularly adaptable for use in measuring the temperature of vehicles subjected to space environment conditions. The aluminized tape, because of its low emissivity, is particularly responsible for shielding the thermocouple from extraneous radiation inputs. The aluminum also acts as an excellent shield from radio frequency (R.F.) signals that may bombard the thermocouple and induce an undesired electromotive force (E.M.F.) therein.

The proper choice of materials, all of which should preferably have very low vapor pressure characteristics, insures that the thermocouple assembly will function properly in high vacuum space environments. The use of a silicone adhesive on the two tapes aforementioned, insures that the thermocouple assembly will stay securely attached to the surface being measured even when maintained in a space environment for extended durations.

It is understood that suitable modifications may be made in the assembly as disclosed by those familiar with the art without departing from the spirit of the invention. Accordingly, all suitable modifications and equivalents are intended to fall within the scope of the invention as claimed.

What is claimed is:

1. A thermocouple assembly for adhesively fastening a thermocouple to be in direct contact with a surface whose temperature is to be sensed comprising
   a strip of tape having first and second sides;
   a thermocouple including first and second thermocouple leads joined at one end to form a thermocouple junction;
   an adhesive layer means on said first side of said strip of tape for adhering said thermocouple to said first side and to a surface whose temperature is to be sensed;
   a heat reflecting coating on said second side of said strip of tape;
   an electrically insulated mounting block;
   means fastening said electrically insulating mounting block to said second side of said strip of tape;
   first and second electrically conducting contact members;
   means mounting said first and second electrically conducting contact members on said electrically insulating mounting block; and
   means electrically connecting said first and second thermocouple leads to said first and second electrically conducting contact members respectively.

2. A thermocouple assembly as recited in claim 1 wherein said tape is of a synthetic material and said first and second electrically conducting contact members comprise first and second solder pins.

3. A thermocouple assembly as recited in claim 1 wherein said tape is of a synthetic material and said first and second electrically conducting contact members comprise first and second areas coated with electrically conducting material, said first and second areas being electrically insulated from one another.

4. A thermocouple assembly as recited in claim 1 wherein said tape is of nylon and said electrically insulating mounting block is adhesively fastened to said second side of said strip of tape.

5. A thermocouple assembly comprising a strip of nylon tape having first and second sides;
- a thermocouple including first and second thermocouple leads joined at one end to form a thermocouple junction;
- an adhesive layer means on said first side of said strip of tape for adhering said thermocouple to said first side and to a surface whose temperature is to be sensed;
- a heat reflecting metallic layer on said second side;
- an electrically insulating mounting block;
- means fastening said electrically insulating mounting block to said second side of said strip of tape;
- first and second electrically conducting contact members;
- means mounting said first and second electrically conducting contact members on said electrically insulating mounting block; and
- means electrically connecting said first and second thermocouple leads to said first and second electrically conducting contact members respectively.

References Cited

UNITED STATES PATENTS 3,075,386   1/1963   Daly.
3,279,956   10/1966  Ekstrom _____ 136—233 X

FOREIGN PATENTS 410,572   5/1934   Great Britain.

ALLEN B. CURTIS, *Primary Examiner.*